United States Patent
Rayos, Jr.

(10) Patent No.: US 11,198,481 B2
(45) Date of Patent: Dec. 14, 2021

(54) AERODYNAMIC MOTORCYCLE UMBRELLA

(71) Applicant: Francisco Rayos, Jr., Alamogordo, NM (US)

(72) Inventor: Francisco Rayos, Jr., Alamogordo, NM (US)

( * ) Notice: Subject to any disclaimer, the term of this patent is extended or adjusted under 35 U.S.C. 154(b) by 0 days.

(21) Appl. No.: 16/140,296

(22) Filed: Sep. 24, 2018

(65) Prior Publication Data

US 2020/0094902 A1 Mar. 26, 2020

(51) Int. Cl.
*A45B 23/00* (2006.01)
*B62J 17/08* (2020.01)
*A45B 11/00* (2006.01)

(52) U.S. Cl.
CPC ............ *B62J 17/08* (2013.01); *A45B 23/00* (2013.01); *A45B 2011/005* (2013.01)

(58) Field of Classification Search
CPC ..... B62J 17/08; A45B 23/00; A45B 2011/005
See application file for complete search history.

(56) References Cited

U.S. PATENT DOCUMENTS

| | | | | |
|---|---|---|---|---|
| 3,863,661 A | * | 2/1975 | Aburto | A45B 19/02 135/20.2 |
| 4,560,196 A | * | 12/1985 | Carter, Sr. | B62J 17/08 135/88.01 |
| 6,565,139 B2 | * | 5/2003 | Bayerle | B60J 11/00 296/77.1 |

* cited by examiner

*Primary Examiner* — D Glenn Dayoan
*Assistant Examiner* — Melissa Ann Bonifazi
(74) *Attorney, Agent, or Firm* — Lyman Moulton, Esq.; Moulton Patents, PLLC

(57) ABSTRACT

An aerodynamic umbrella includes a dual durometer skeleton forming an aerodynamic rectangular dome of an apex and a plurality of triangles extending from the apex thereof over a motorcyclist. A front triangle portion thereof is attached to a motorcycle at multiple points on a motorcycle handlebar and front end. A waterproof translucent skin is attached to the skeleton and a portion of the skin attached to the front isosceles triangle and a dome portion over a motorcyclist head is transparent. A remainder of the waterproof translucent skin is highly colored for safety purposes. A rear skirt is attached to the rear triangle on a side opposite the apex. The rear skirt portion is wedged between the motorcyclist and a seat of the motorcycle when sat upon by the motorcyclist to provide an adjustable point of attachment of the umbrella to the motorcycle and to the motorcyclist versus a rear spoiler.

20 Claims, 4 Drawing Sheets

AERODYNAMIC MOTORCYCLE UMBRELLA

BACKGROUND

Umbrellas are made in a variety of ways to shelter and protect people and things. Umbrellas are designed and constructed in a variety of ways to suit a variety of needs and applications. For instance, hand operated umbrellas may be used for rain and sun protection in walking and staying still. Even sports umbrellas used like portable tents are becoming common. On the other hand, not much is available to users wanting to both stroll about under an umbrella and also ride a motorcycle. Enthusiasts will try to rig their common umbrella to their motorcycle only to have it blow away or to collapse on them and threaten accidents and harm to others. Furthermore, other enthusiasts will simply ride their motorcycle with their umbrella tucked away somewhere while they get drenched on their motorcycle.

All of these devices fall short as a ubiquitous and universal umbrella for motorcycle enthusiasts. For instance, though small conventional umbrellas store well in a motorcycle compartment or a rider's jacket, these umbrellas do not stand up under the high wind velocity of freeway or highways speeds on a motorcycle. On the other hand, simple rain ponchos also do not provide the visibility needed between a rider and the road for safe operation of a motorcycle. A more sophisticated device is needed to protect a motorcycle rider from rain and high wind velocity while at the same time providing for visibility between the rider's helmet in all directions for maximum safety.

SUMMARY OF THE INVENTION

An umbrella device includes a dual durometer skeleton forming an aerodynamic rectangular dome of an apex and a plurality of triangles extending from the apex thereof over a motorcyclist. A front triangle portion thereof is attached to a motorcycle at multiple points on a motorcycle handlebar and front end. A waterproof translucent skin is attached to the skeleton and a portion of the skin attached to the front isosceles triangle and a dome portion over a motorcyclist head is transparent. A remainder of the waterproof translucent skin is highly colored for safety purposes. A rear skirt is attached to the rear triangle on a side opposite the apex. The rear skirt portion is wedged between the motorcyclist and a seat of the motorcycle when sat upon by the motorcyclist to provide an adjustable point of attachment of the umbrella to the motorcycle and to the motorcyclist.

An aerodynamic umbrella disclosed includes multiple dual durometer triangle frames extending from an apex thereof over a motorcyclist wherein two front isosceles triangles sharing a longest edge provide a front spine attached to the motorcycle at points on a motorcycle handlebar and frontend. The aerodynamic umbrella also includes a waterproof translucent skin attached to the dual durometer skeleton. A portion of the skin attached to the two front isosceles triangles is transparent and a remainder of the waterproof translucent skin is highly colored for safety purposes. Two rear isosceles triangle frames extending from the apex and sharing a longest edge provide a rear spine attached to the motorcycle at multiple points on a motorcycle backend to provide an aerodynamic umbrella airfoil over the motorcycle and over the motorcyclist.

A method of protecting a motorcyclist from weather and airflow includes erecting dual durometer triangle frames extending from an apex thereof over a motorcyclist wherein two front isosceles triangles sharing a longest edge provide a front spine attached to the motorcycle at points on a motorcycle handlebar and frontend. The method also includes attaching a waterproof translucent skin to the dual durometer skeleton, a portion of the skin attached to the two front isosceles triangles being transparent and a remainder of the waterproof translucent skin being highly colored. The method further includes creating two rear isosceles triangle frames extending from the apex and sharing a longest edge provide a rear spine attached to the motorcycle at a plurality of points on a motorcycle backend to provide protection to the motorcycle and to the motorcyclist from the weather and from an airflow.

Figure 1:
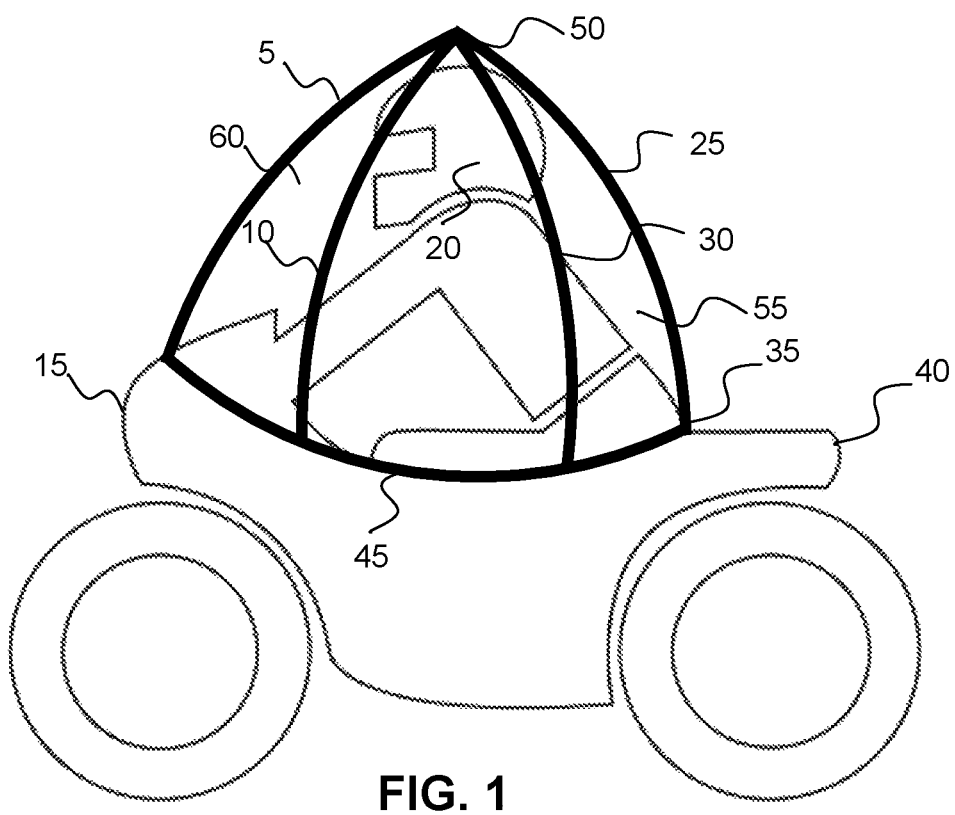
FIG. 1 is a side perspective view of an aerodynamic motorcycle umbrella with a back skirt tucked under a rider in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term 'triangle' is used in the common sense to refer to geometries having 3 sides and 3 angles including an isosceles, an obtuse, an acute and a right triangle and any others in the art. Specifically, the isosceles triangle has 2 equal sides and 2 equal angles. The term, 'dual durometer,' refers to the hardness of a structural material and the flexibility of another material formed with the high durometer material into a one piece profile material of a uniform and consistent cross section.

FIG. 1 is a side perspective view of an aerodynamic motorcycle umbrella with a back skirt tucked under a rider in accordance with an embodiment of the present disclosure. The aerodynamic motorcycle umbrella includes a first isosceles triangle side 5, a second triangle side 10, a rear isosceles triangle side 25 and a second triangle side 30, a skirt 35 tucked in or wedged between a rider and the motorcycle seat and a bottom edge or skirt 45 of the umbrella device which is not scalloped as in conventional umbrellas but is rather convex from vertice to vertice. A front end of the motorcycle 15 and a backend or backseat 40 of the motorcycle and the rider's helmet or head 20 are also depicted.

A dual durometer skeleton forms an aerodynamic rectangular dome of an apex 50 and a plurality of triangles extending from the apex 50 thereof over a motorcyclist wherein a front isosceles triangle thereof is attached to a motorcycle at plurality of points on a motorcycle handlebar and front end 15. A waterproof translucent skin 55 is attached to the dual durometer skeleton. A portion 60 of the skin is attached to the front isosceles triangle and the dome portion over a motorcyclist head being transparent and a remainder of the waterproof translucent skin being highly colored. A rear skirt is attached to a rear isosceles triangle on a side opposite the apex, the rear skirt portion being wedgeable between the motorcyclist and a seat of the motorcycle when sat upon by the motorcyclist to provide an adjustable point of attachment of the umbrella to the motorcycle and to the motorcyclist.

Figure 2:
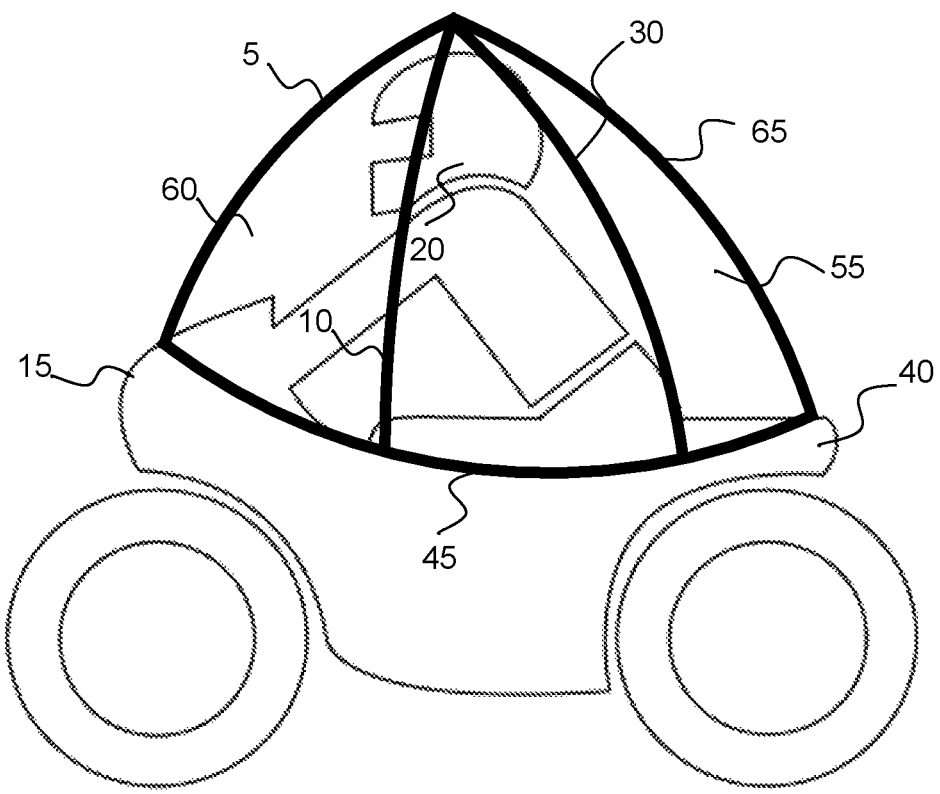
FIG. 2 is a side perspective view of an aerodynamic motorcycle umbrella with a back spoiler in accordance with an embodiment of the present disclosure.

FIG. 2 is a side perspective view of an aerodynamic motorcycle umbrella with a back spoiler in accordance with an embodiment of the present disclosure. Same reference numbers are used for same or similar features of the present figure with those of other figures. The back spoiler 65 of the present depiction is comprised of the rear isosceles triangle and attaches to the rear seat or the rear portion of the motorcycle 40. The back spoiler acts aerodynamically to reduce drag on the rider and the cycle during motion and it further protects the rider from the weather.

The umbrella skeleton component triangles comprise at least a front, a back isosceles triangle and a left side and a right side isosceles triangles comprised of a dual durometer material for hardness and flexibility. The two side triangles comprise a stretchable skin to cover different motorcyclists of varying sizes. The triangle sides or the skeleton frame ribs are arced in a convex fashion as conventional umbrellas are arced. Other embodiments include straight ribs that are neither concave nor convex.

Figure 3:
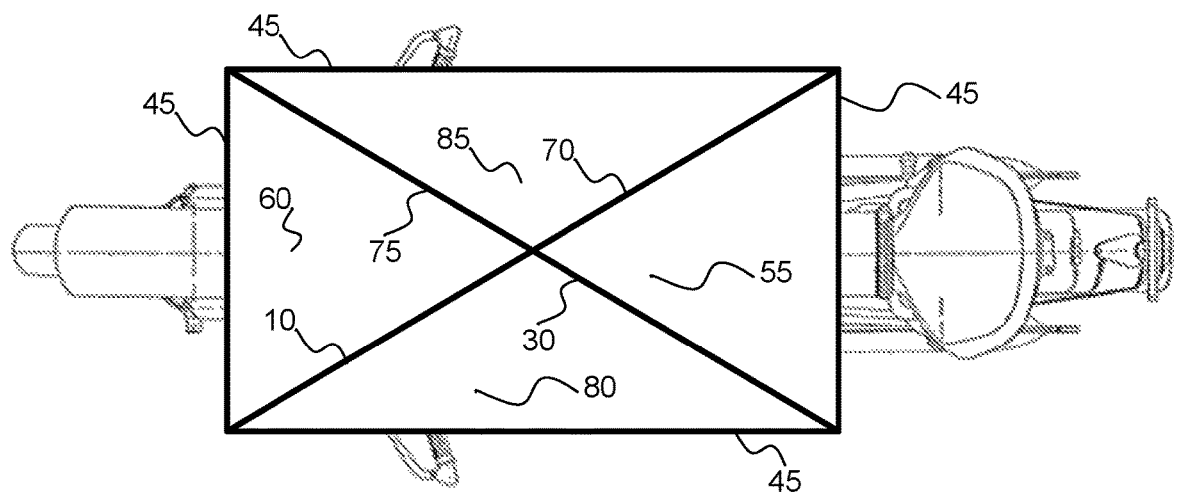
FIG. 3 is a top elevational view of an aerodynamic motorcycle umbrella with a back skirt tucked under a rider in accordance with an embodiment of the present disclosure.

FIG. 3 is a top elevational view of an aerodynamic motorcycle umbrella with a back skirt tucked under a rider in accordance with an embodiment of the present disclosure. When viewed from the top, the dual durometer skeleton comprises an elongated 'X' pattern with the apex at the intersecting legs of the 'X'. Same reference numbers are used for same or similar features of the present figure with those of other figures. Triangle skeleton component edges include the rear isosceles triangle edge 70 and the front isosceles triangle edge 75.

A front skirt is attached to the front isosceles triangle on a side opposite the apex in certain embodiments. The front skirt further provides weather protection for motorcycles not having a windshield. The waterproof translucent skin is highly colored with bright fluorescent colors to provide added visibility and added safety. The umbrella device is collapsible via rolling and folding into one of a bag and a compartment.

An embodiment of the disclosed umbrella device includes at least one of hook and loop fasteners, snap fasteners and tying cords designed to attach the umbrella device to the handlebars of the motorcycle. The dual durometer skeleton comprises telescoping metal wires, dual durometer plastic composite members and ribs formed from the skin material. The dual durometer skeleton also includes an exoskeleton of jointed spring bars similar to an umbrella tent in other embodiments. Furthermore, an attachment on an underside of the apex of the umbrella device attaches to a helmet of the motorcyclist via a cyanoacrylate bonded snap pad on the helmet and a complementary snap pad on the underside of the umbrella device.

Figure 4:
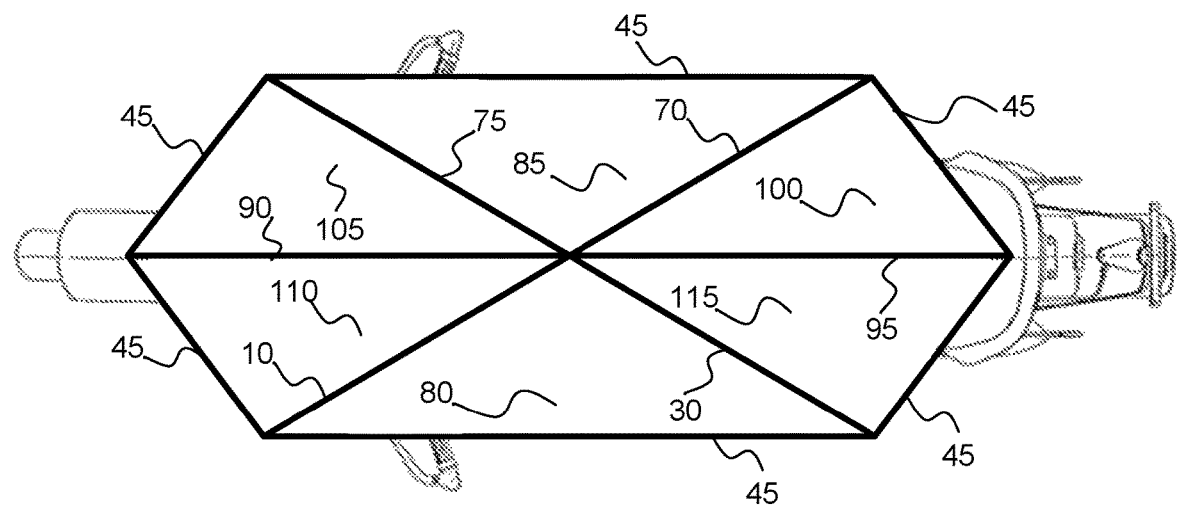
FIG. 4 is a top elevational view of an aerodynamic motorcycle umbrella with a back spoiler in accordance with an embodiment of the present disclosure.

FIG. 4 is a top elevational view of an aerodynamic motorcycle umbrella with a back spoiler in accordance with an embodiment of the present disclosure. Same reference numbers are used for same or similar features of the present figure with those of other figures. The front pair of isosceles triangles 105 and 110 form an aerodynamic windshield dissected by the front spine 90. The rear pair of isosceles triangles 100 and 115 form an aerodynamic air spoiler dissected by the rear spine 95. The dual durometer skeleton comprises an elongated 'X' pattern with the apex at the intersecting legs of the 'X' and a front and a rear spine intersecting the apex similar to an asterisk '*' configuration or similar to the lines joining opposite points of a six pointed star pattern.

Figure 5:
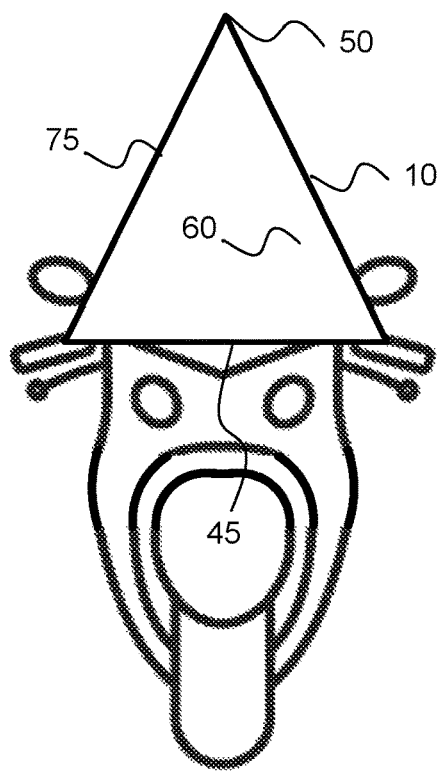
FIG. 5 is a front elevational view of an aerodynamic motorcycle umbrella with a front triangular shield in accordance with an embodiment of the present disclosure.

FIG. 5 is a front elevational view of an aerodynamic motorcycle umbrella with a front triangular shield in accordance with an embodiment of the present disclosure. Same reference numbers are used for same or similar features of the present figure with those of other figures. The front isosceles triangle 60 is bound on one side 10 and the other side 75 and the apex 50 and the edge skirt 45.

Figure 6:
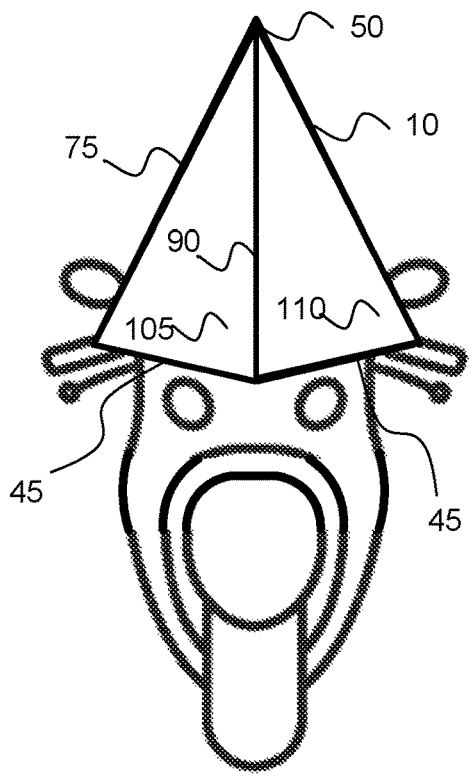
FIG. 6 is a front elevational view of an aerodynamic motorcycle umbrella with a dual front triangular shield in accordance with an embodiment of the present disclosure.

FIG. 6 is a front elevational view of an aerodynamic motorcycle umbrella with a dual front triangular shield in accordance with an embodiment of the present disclosure. Same reference numbers are used for same or similar features of the present figure with those of other figures. The front pair of isosceles triangles 105 and 110 are bound by the edges 10 and 75 and are dissected by the front spine 90 and the edge skirt 45. The spined umbrella may provide more protection from weather and more protection from air flow during travel but may have less visibility due to the dissecting spine.

Figure 7:
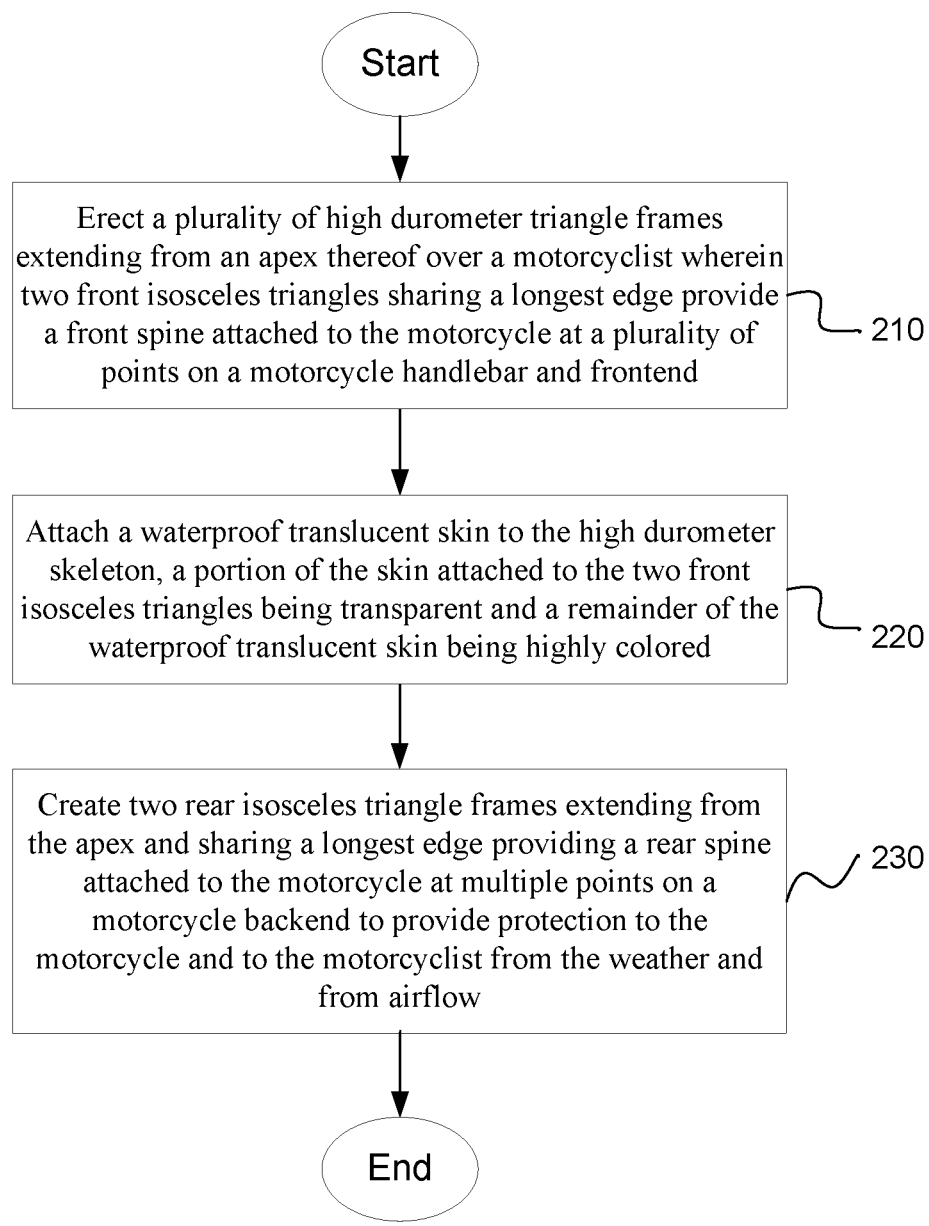
FIG. 7 is a flow chart of a method of protecting a motorcyclist from weather and air flow via an aerodynamic motorcycle umbrella in accordance with an embodiment of the present disclosure.

FIG. 7 is a flow chart of a method of protecting a motorcyclist from weather and air flow via an aerodynamic motorcycle umbrella in accordance with an embodiment of the present disclosure. The method includes erecting 210 dual durometer triangle frames extending from an apex thereof over a motorcyclist wherein two front isosceles triangles sharing a longest edge provide a front spine attached to the motorcycle at points on a motorcycle handlebar and frontend. The method also includes attaching 220 a waterproof translucent skin to the dual durometer skeleton, a portion of the skin attached to the two front isosceles triangles being transparent and a remainder of the waterproof translucent skin being highly colored. The method further includes creating 230 two rear isosceles triangle frames extending from the apex and sharing a longest edge provide a rear spine attached to the motorcycle at a plurality of points on a motorcycle backend to provide protection to the motorcycle and to the motorcyclist from the weather and from an airflow.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. An umbrella device, comprising:
    a dual durometer skeleton forming an aerodynamic rectangular dome of an apex and a plurality of triangles extending from the apex thereof over a motorcyclist wherein a front isosceles triangle thereof is attached to a motorcycle at plurality of points on a motorcycle handlebar and front end;
    a waterproof translucent skin attached to the dual durometer skeleton, a portion of the skin attached to the front isosceles triangle and the dome portion over a motorcyclist head being transparent and a remainder of the waterproof translucent skin being highly colored; and
    a rear skirt attached to a rear isosceles triangle on a side opposite the apex, the rear skirt portion being wedgeable between the motorcyclist and a seat of the motorcycle as sat upon by the motorcyclist to provide an adjustable point of attachment of the umbrella to the motorcycle and to the motorcyclist depending on how much of the rear skirt is sat upon and how much is free to cover the motorcyclist.

2. The umbrella device of claim 1, wherein the dual durometer skeleton includes at least a front isosceles triangle and a back isosceles triangle comprised of a high durometer structural material and a flexible material.

3. The umbrella device of claim 1, wherein the plurality of triangles include at least two side isosceles triangles comprising a stretchable skin to cover different motorcyclists of varying sizes.

4. The umbrella device of claim 1, wherein the dual durometer skeleton comprises an elongated 'X' pattern with the apex at the intersecting legs of the 'X'.

5. The umbrella device of claim 1, further comprising a front skirt attached to the front isosceles triangle on a side opposite the apex, the front skirt configured to provide weather protection for motorcycles not having a windshield.

6. The umbrella device of claim 1, wherein the waterproof translucent skin is highly colored with bright fluorescent colors to provide added visibility and added safety.

7. The umbrella device of claim 1, wherein the umbrella device is collapsible via rolling and folding into one of a bag and a compartment.

8. The umbrella device of claim 1, wherein at least one of hook and loop fasteners, snap fasteners and tying cords attach the umbrella device to the handlebars of the motorcycle.

9. The umbrella device of claim 1, wherein the dual durometer skeleton comprises telescoping metal wires, flexible and high durometer plastic composite members and ribs formed from the skin material.

10. The umbrella device of claim 1, wherein the dual durometer skeleton comprises an exoskeleton of jointed spring bars similar to an umbrella tent.

11. The umbrella device of claim 1, further comprising an attachment on an underside of the apex of the umbrella device to a helmet of the motorcyclist including a cyanoacrylate bonded snap pad on the helmet and a complementary snap pad on the underside of the umbrella device.

12. An aerodynamic umbrella, comprising:
    a plurality of dual durometer triangle frames extending from an apex thereof over a motorcyclist wherein two front isosceles triangles sharing a longest edge provide a front spine attached to the motorcycle at a plurality of points on a motorcycle handlebar and frontend;
    a waterproof translucent skin attached to the dual durometer skeleton, a portion of the skin attached to the two front isosceles triangles being transparent and a remainder of the waterproof translucent skin being highly colored,
    two rear isosceles triangle frames of a dual durometer composite extending from the apex and sharing a longest edge provide a rear spine attached to the motorcycle at a plurality of points on a motorcycle backend to provide an aerodynamic umbrella airfoil over the motorcycle and over the motorcyclist; and
    a rear skirt attached to a rear isosceles triangle on a side opposite the apex, the rear skirt portion being wedgeable between the motorcyclist and a seat of the motorcycle as sat upon by the motorcyclist to provide an adjustable point of attachment of the umbrella to the motorcycle and to the motorcyclist depending on how much of the rear skirt is sat upon and how much is free to cover the motorcyclist.

13. The aerodynamic umbrella of claim 12, wherein the plurality of triangles comprise at least a front pair and a back pair isosceles triangles comprised of a high durometer structural material and a flexible material.

14. The aerodynamic umbrella of claim 12, wherein the plurality of triangles include at least two side isosceles triangles comprising a stretchable skin to cover different motorcyclists of varying sizes.

15. The aerodynamic umbrella of claim 12, wherein the dual durometer skeleton comprises an elongated 'X' pattern with the apex at the intersecting legs of the 'X' and a front and a rear spine intersecting the apex similar to an asterisk '*.'

16. The aerodynamic umbrella of claim 12, wherein the front two isosceles triangles form a front skirt configured to provide weather protection and an airfoil for motorcycles not having a windshield.

17. A method of protecting a motorcyclist, comprising:
    erecting a plurality of dual durometer triangle frames extending from an apex thereof over a motorcyclist wherein two front isosceles triangles sharing a longest edge provide a front spine attached to the motorcycle at a plurality of points on a motorcycle handlebar and frontend;
    attaching a waterproof translucent skin to the dual durometer skeleton, a portion of the skin attached to the two front isosceles triangles being transparent and a remainder of the waterproof translucent skin being highly colored;
    creating two rear isosceles triangle frames extending from the apex and sharing a longest edge provide a rear spine attached to the motorcycle at a plurality of points on a motorcycle backend to provide protection to the motorcycle and to the motorcyclist from the weather and from an airflow; and wedging a rear skirt attached to a rear isosceles triangle on a side opposite the apex between the motorcyclist and a seat of the motorcycle as sat upon by the motorcyclist to provide an adjustable point of attachment of the umbrella to the motorcycle and to the motorcyclist depending on how much of the rear skirt is sat upon and how much is free to cover the motorcyclist.

18. The method of protecting a motorcyclist of claim 17, further comprising providing at least two side isosceles triangles disposed laterally to the motorcyclist and comprising a stretchable skin to cover different motorcyclists of varying sizes.

19. The method of protecting a motorcyclist of claim 17, wherein the front two isosceles triangles form a front skirt configured to provide weather protection and an airfoil for motorcycles not having a windshield.

20. The method of protecting a motorcyclist of claim 17, further comprising creating an elongated 'X' pattern of the plurality of triangles with the apex at the intersecting legs of the 'X' and a front and a rear spine intersecting the apex similar to an asterisk '*.'

* * * * *